(12) United States Patent
Liao et al.

(10) Patent No.: US 8,216,476 B2
(45) Date of Patent: Jul. 10, 2012

(54) METHOD FOR REMOVING PHOSPHORUS

(75) Inventors: Zhimin Liao, Shenzhen (CN); Zhihua Yuan, Shenzhen (CN); Jialin Zhou, Shenzhen (CN); Lingyun He, Shenzhen (CN); Shuyan Chen, Shenzhen (CN); Aiguo Wan, Shenzhen (CN); Wenqian Chen, Shenzhen (CN)

(73) Assignee: Jiangxi JDL Environmental Protection Research Ltd., Nanchang (CN)

( * ) Notice: Subject to any disclaimer, the term of this patent is extended or adjusted under 35 U.S.C. 154(b) by 122 days.

(21) Appl. No.: 12/650,588

(22) Filed: Dec. 31, 2009

(65) Prior Publication Data
US 2011/0062084 A1  Mar. 17, 2011

(30) Foreign Application Priority Data
Sep. 15, 2009  (CN) .......................... 2009 1 0186048

(51) Int. Cl.
*B01D 15/00*  (2006.01)
(52) U.S. Cl. ......... 210/660; 210/670; 210/906; 210/907

(58) Field of Classification Search ................... 210/660, 210/670, 906–907
See application file for complete search history.

(56) References Cited

U.S. PATENT DOCUMENTS

| | | | | |
|---|---|---|---|---|
| 3,956,118 | A | * | 5/1976 | Kleber et al. ................ 210/711 |
| 5,547,583 | A | * | 8/1996 | Alexander .................... 210/666 |
| 7,862,836 | B2 | * | 1/2011 | Nelson .......................... 424/617 |
| 2010/0116090 | A1 | * | 5/2010 | Nakamura et al. ............. 75/392 |
| 2010/0266343 | A1 | * | 10/2010 | Takahashi ................ 405/129.85 |

* cited by examiner

*Primary Examiner* — Chester Barry
(74) *Attorney, Agent, or Firm* — Matthias Scholl P.C.; Matthias Scholl

(57) ABSTRACT

A method for removing phosphorus includes at least the steps of: 1) placing lanthanum oxide hydrate (absorbent) into a device for removing phosphorus, and allowing sewage having a phosphorus content of less than 100 mg/L to flow through the device; 2) adding sodium hydroxide (regeneration solution of the absorbent) when the absorption capacity of the device is exhausted, and allowing the regeneration reaction to proceed for between 4 and 12 hours; and 3) collecting eluate from step 2) and recycling phosphorus.

20 Claims, 1 Drawing Sheet

METHOD FOR REMOVING PHOSPHORUS

CROSS-REFERENCE TO RELATED APPLICATIONS

Pursuant to 35 U.S.C. §119 and the Paris Convention Treaty, this application claims the benefit of Chinese Patent Application No. 200910186048.5 filed Sep. 15, 2009, the contents of which are incorporated herein by reference.

BACKGROUND OF THE INVENTION

1. Field of the Invention

The invention relates to a method for removing phosphorus, and more particularly to a method for removing phosphorus with an absorbent.

2. Description of the Related Art

Conventional methods for removing phosphorus from sewage include physicochemical treatment methods, for example, ion-exchange methods and chemical coagulation methods, and biological treatment methods, for example, $A_2/O$ method, A/O method, and phoredox method. Physicochemical treatment methods require a large amount of chemical reagents and thereby the cost is very high. Biological treatment methods often produce much sludge which is difficult to handle.

As an ideal technology for removing phosphorus, absorption methods have dual function of removing and recycling phosphorus. The mechanism is that: phosphorus adheres to an absorbent, experiences ion exchange and surface precipitate, and then separates from sewage. The phosphorus can be recycled by desorption.

Absorbent is a key element for absorption method. Conventional absorbents are selected from natural adsorbents, activated alumina or derivatives thereof, or synthetic adsorbents, and so on. However, these absorbents have disadvantages as below:

1) Low absorption capacity, particularly under a low concentration;
2) Low capacity of selective absorption;
3) Low speed of absorption and long reaction time;
4) Difficulty for recycling and instable performance; and
5) The raw material used for preparation of these absorbents is expensive.

SUMMARY OF THE INVENTION

In view of the above-described problems, it is one objective of the invention to provide a method for removing phosphorus having high absorption capacity, low cost, and with capacity of phosphorus recycling.

To achieve the above objectives, in accordance with one embodiment of the invention, there is provided a method for removing phosphorus having high absorption capacity, low cost, and with capacity of phosphorus recycling, the method comprising the steps of: 1) removing phosphorus from sewage with lanthanum oxide hydrate as an absorbent; 2) separating phosphorus and recycling the absorbent; and 3) recycling phosphorus.

Specifically, the method comprises the steps of:

1) placing lanthanum oxide hydrate as an absorbent into a device for removing phosphorus, allowing sewage having a phosphorus content of less than 100 mg/L to flow through the device;
2) adding sodium hydroxide as a regeneration solution of the absorbent when the absorption capacity of the device is saturated, and allowing to react for between 4 and 12 hours; and
3) collecting eluate of step 2) and recycling phosphorus.

In this embodiment, phosphorus in sewage has a full contact with the absorbent of lanthanum oxide hydrate and adheres to the surface thereof, so that phosphorus is transferred from sewage to the surface of lanthanum oxide hydrate; upon addition of sodium hydroxide as a regeneration solution, phosphorus adhering to the surface of lanthanum oxide hydrate is transferred to the regeneration solution, and thereby lanthanum oxide hydrate as the absorbent is recycled. The phosphorus content of sewage after treated by the method is less than 0.5 mg/L.

In a class of this embodiment, the device for removing phosphorus is an absorption column or an absorption tank, either of which is corrosion resistant.

In a class of this embodiment, a particle size of the lanthanum oxide hydrate is between 2 and 20 mm.

In a class of this embodiment, quartz sand is disposed as a supporting layer under the absorption column, with a thickness of between 0.2 and 0.6 m, and the absorption layer of lanthanum oxide hydrate is disposed on the quartz sand, with a thickness of between 0.5 and 2.0 m.

In a class of this embodiment, the absorption tank is made of reinforced concrete or steel, and it is square or round in shape. Phosphorus in sewage has a full contact with the absorbent of lanthanum oxide hydrate and thereby the two compounds are adhered to each other.

In a class of this embodiment, a retention time of the sewage in the device for removing phosphorus is between 5 and 30 min.

In a class of this embodiment, the sewage flows through the device for removing phosphorus from the bottom up, and thereby the absorbent of lanthanum oxide hydrate is suspended.

In a class of this embodiment, a saturation signal of the device for removing phosphorus is that the phosphorus content of the effluent is more than 0.5 mg/L.

In a class of this embodiment, a concentration of the sodium hydroxide is between 2 and 8% by weight.

In a class of this embodiment, a volume ratio of the sodium hydroxide to the lanthanum oxide hydrate is between 1 and 2.

In a class of this embodiment, after lanthanum oxide hydrate is recycled, eluate having high concentration of phosphorus is released into a solution tank and recycled with evaporation or other means.

The method of the invention is suitable for removing phosphorus by large-scale urban centralized sewage treatment plants or for small-scale decentralized sewage treatment, and it is also suitable for enhanced phosphorus removal by sewage treatment plants.

Advantages of the invention are summarized below:

1) lanthanum oxide hydrate has a large absorption capacity and low production cost;
2) lanthanum oxide hydrate is recycled with sodium hydroxide, which is simple, convenient, and low cost; and
3) lanthanum oxide hydrate has an obvious selective absorption on phosphorus, so it can be used for removing phosphorus in a variety of phosphorus-containing sewage.

BRIEF DESCRIPTION OF THE DRAWINGS

The invention is described hereinbelow with reference to accompanying drawings, in which.

DETAILED DESCRIPTION OF THE EMBODIMENTS

Figure 1:
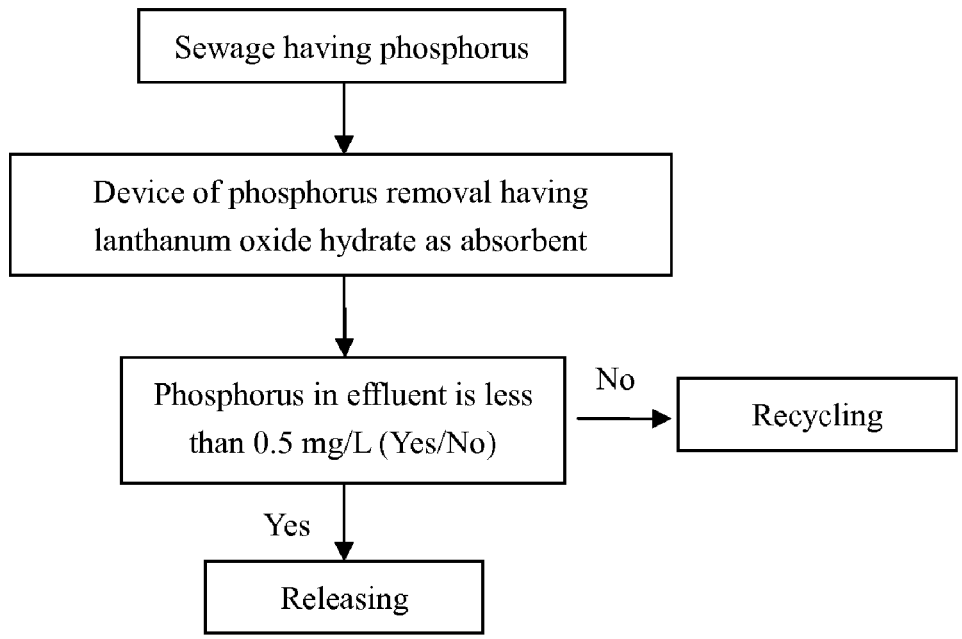
FIG. 1 is a flow chart of phosphorus removal with lanthanum oxide hydrate according to one embodiment of the invention.
Figure 2:
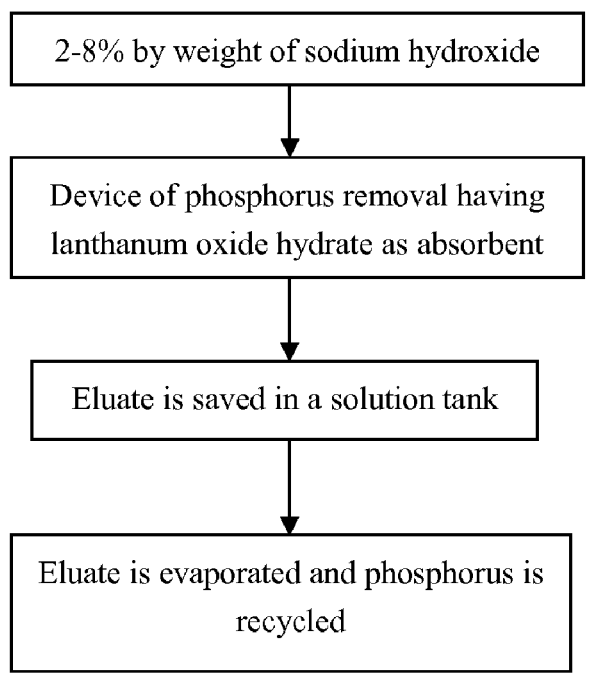
FIG. 2 is a flow chart of recycling of lanthanum oxide hydrate according to one embodiment of the invention.

For further illustrating the invention, experiments detailing phosphorus removal with lanthanum oxide hydrate are described below. It should be noted that the following examples are intended to describe and not to limit the invention.

Example 1

After treated with biological method, water quality of effluent from a sewage treatment plant was as follows: phosphorus, between 0.6 and 1.5 mg/L; SS, between 3.5 and 20.5 mg/L. According to one embodiment of the invention, a method for removing phosphorus is described as below:

1) After large suspended particles were removed by pretreatment, sewage having phosphorus flowed through a device for removing phosphorus from the bottom up. The device was an absorption column, at the bottom of which quartz sands were disposed, and lanthanum oxide hydrate as an absorbent was disposed on the quartz sands.

2) During the course of flowing through the device for removing phosphorus, phosphorus in the sewage was adhered to and fixed on the surface of lanthanum oxide hydrate.

3) The retention time of the sewage in the device was 5 min, and if the phosphorus content of the effluent was less than 0.5 mg/L, the effluent was allowed to enter a clean water tank.

4) When the phosphorus content of the effluent was more than 0.5 mg/L, which meant lanthanum oxide hydrate in the device was saturated, a recycling operation was required. 5% by weight of sodium hydroxide with volume twice that of lanthanum oxide hydrate was added to the device, and allowed to react for 4 hours.

5) After the absorbent was recycled, eluate having high concentration of phosphorus was collected and saved in a solution tank.

6) The eluate having high concentration of phosphorus was evaporated and phosphorus was recycled as fertilizer.

Example 2

After treated with biological method, water quality of effluent from a sewage treatment plant was as follows: phosphorus, 3 mg/L; SS, between 3.5 and 20.5 mg/L. According to one embodiment of the invention, a method for removing further phosphorus is described as below:

1) After large suspended particles were removed by pretreatment, sewage having phosphorus flowed through a device for removing phosphorus from the bottom up. The device was an absorption tank, at the bottom of which quartz sands were disposed, and lanthanum oxide hydrate as an absorbent was disposed on the quartz sands.

2) During the course of flowing through the device for removing phosphorus, phosphorus in the sewage was adhered to and fixed on the surface of lanthanum oxide hydrate.

3) The retention time of the sewage in the device was 10 min, and if the phosphorus content of the effluent was less than 0.5 mg/L, the effluent was allowed to enter a clean water tank.

4) When the phosphorus content of the effluent was more than 0.5 mg/L, which meant lanthanum oxide hydrate in the device was saturated, a recycling operation was required. 2% by weight of sodium hydroxide with volume twice that of lanthanum oxide hydrate was added to the device, and allowed to react for between 4 and 12 hours.

5) After the absorbent was recycled, eluate having high concentration of phosphorus was collected and saved in a solution tank.

6) The eluate having high concentration of phosphorus was evaporated and phosphorus was recycled as fertilizer.

Example 3

Water quality of sewage was as follows: phosphorus, 5 mg/L; SS, between 3.5 and 20.5 mg/L. According to one embodiment of the invention, a method for removing further phosphorus is described as below:

1) After large suspended particles were removed by pretreatment, sewage having phosphorus flowed through a device for removing phosphorus from the bottom up. The device was an absorption tank, at the bottom of which quartz sands were disposed, and lanthanum oxide hydrate as an absorbent was disposed on the quartz sands.

2) During the course of flowing through the device for removing phosphorus, phosphorus in the sewage was adhered to and fixed on the surface of lanthanum oxide hydrate.

3) The retention time of the sewage in the device was 20 min, and if the phosphorus content of the effluent was less than 0.5 mg/L, the effluent was allowed to enter a clean water tank.

4) When the phosphorus content of the effluent was more than 0.5 mg/L, which meant lanthanum oxide hydrate in the device was saturated, a recycling operation was required. 6% by weight of sodium hydroxide with volume twice that of lanthanum oxide hydrate was added to the device, and allowed to react for 8 hours.

5) After the absorbent was recycled, eluate having high concentration of phosphorus was collected and saved in a solution tank.

6) The eluate having high concentration of phosphorus was evaporated and phosphorus was recycled as fertilizer.

Example 4

Water quality of sewage was as follows: phosphorus, 100 mg/L; SS, between 3.5 and 20.5 mg/L. According to one embodiment of the invention, a method for removing further phosphorus is described as below:

1) After large suspended particles were removed by pretreatment, sewage having phosphorus flowed through a device for removing phosphorus from the bottom up. The device was an absorption tank, at the bottom of which quartz sands were disposed, and lanthanum oxide hydrate as an absorbent was disposed on the quartz sands.

2) During the course of flowing through the device for removing phosphorus, phosphorus in the sewage was adhered to and fixed on the surface of lanthanum oxide hydrate.

3) The retention time of the sewage in the device was 30 min, and if the phosphorus content of the effluent was less than 0.5 mg/L, the effluent was allowed to enter a clean water tank.

4) When the phosphorus content of the effluent was more than 0.5 mg/L, which meant lanthanum oxide hydrate in the device was saturated, a recycling operation was required. 8% by weight of sodium hydroxide with volume twice that of lanthanum oxide hydrate was added to the device, and allowed to react for 12 hours.

5) After the absorbent was recycled, eluate having high concentration of phosphorus was collected and saved in a solution tank.

6) The eluate having high concentration of phosphorus was evaporated and phosphorus was recycled as fertilizer.

While particular embodiments of the invention have been shown and described, it will be obvious to those skilled in the art that changes and modifications may be made without departing from the invention in its broader aspects, and therefore, the aim in the appended claims is to cover all such changes and modifications as fall within the true spirit and scope of the invention.

The invention claimed is:

1. A method for removing phosphorus, the method comprising the steps of:
   1) disposing lanthanum oxide hydrate in a device to act as an absorbent, directing sewage to flow into said device; allowing phosphorus in said sewage to adhere to the surface of said absorbent, and directing an effluent from said device to flow out into a water tank;
   2) adding a solution of sodium hydroxide to said device, whereby said absorbent is recycled and an eluate containing phosphorus is produced; and
   3) directing said eluate into a solution tank, and evaporating said eluate to form a fertilizer comprising phosphorus.

2. The method of claim 1,
   wherein phosphorus content of said sewage added in said device is less than 100 mg/L;
   and a retention time of said sodium hydroxide in said device is between 4 and 12 hours.

3. The method of claim 2, wherein said device for removing phosphorus is corrosion resistant.

4. The method of claim 2, wherein a particle size of said lanthanum oxide hydrate is between 2 and 20 mm.

5. The method of claim 2, wherein a retention time of said sewage in said device for removing phosphorus is between 5 and 30 min.

6. The method of claim 2, wherein a concentration of said sodium hydroxide is between 2 and 8% by weight.

7. The method of claim 2, wherein a volume ratio of said sodium hydroxide to said lanthanum oxide hydrate is between 1 and 2.

8. The method of claim 2, wherein a saturation signal of said device for phosphorus is that the phosphorus content of the effluent is more than 0.5 mg/L.

9. The method of claim 1, wherein a particle size of said lanthanum oxide hydrate is between 2 and 20 mm.

10. A method for removing phosphorus, the method comprising:
    1) disposing lanthanum oxide hydrate having a particle size of between 2 and 20 mm in a device to act as an absorbent, directing sewage to flow into said device and allowing phosphorus in said sewage to adhere to the surface of said absorbent;
    2) when phosphorus content of an effluent from said device is less than 0.5 mg/L, directing the effluent from said device to flow out into a water tank; when phosphorus content of the effluent from said device is more than 0.5 mg/L, adding a solution of sodium hydroxide to said device, whereby said absorbent is recycled and an eluate containing phosphorus is produced; and
    3) directing said eluate into a solution tank, and evaporating said eluate to form a fertilizer comprising phosphorus.

11. The method of claim 10, wherein phosphorus content of said sewage added into said device is less than 100 mg/L, and a retention time of said sodium hydroxide in said device is between 4 and 12 hours.

12. The method of claim 10, wherein a retention time of said sewage in said device for removing phosphorus is between 5 and 30 min.

13. The method of claim 10, wherein a concentration of said sodium hydroxide is between 2 and 8% by weight.

14. The method of claim 10, wherein a volume ratio of said sodium hydroxide to said lanthanum oxide hydrate is between 1 and 2.

15. The method of claim 10, wherein said device is an absorption column or an absorption tank.

16. A method for removing phosphorus, the method comprising:
    1) providing a device for removing phosphorus, wherein the device is an absorption column or an absorption tank; disposing quartz sand at the bottom of said absorption column or said absorption tank, placing a layer of lanthanum oxide hydrate having a particle size of between 2 and 20 mm on said quartz sand to act as an absorbent; directing sewage to flow into said device, and allowing phosphorus in said sewage to adhere to the surface of said absorbent;
    2) when phosphorus content of an effluent from said device is less than 0.5 mg/L, directing the effluent from said device to flow out into a water tank; when phosphorus content of the effluent from said device is more than 0.5 mg/L, adding a solution of sodium hydroxide to said device, whereby said absorbent is recycled and an eluate containing phosphorus is produced; and
    3) directing said eluate into a solution tank, and evaporating said eluate to form a fertilizer comprising phosphorus.

17. The method of claim 16, wherein phosphorus content of said sewage added into said device is less than 100 mg/L, and a retention time of said sodium hydroxide in said device is between 4 and 12 hours.

18. The method of claim 16, wherein a retention time of said sewage in said device for removing phosphorus is between 5 and 30 min.

19. The method of claim 16, wherein a concentration of said sodium hydroxide is between 2 and 8% by weight.

20. The method of claim 16, wherein a volume ratio of said sodium hydroxide to said lanthanum oxide hydrate is between 1 and 2.

* * * * *